(12) United States Patent
Kim et al.

(10) Patent No.: US 10,533,686 B2
(45) Date of Patent: Jan. 14, 2020

(54) HYDRAULIC TUBE CONNECTOR FOR VEHICLE

(71) Applicants: HYUNDAI MOTOR COMPANY, Seoul (KR); KIA MOTORS CORPORATION, Seoul (KR)

(72) Inventors: Eun Sik Kim, Gwangmyeong-si (KR); Jong Ho Hong, Seoul (KR); Jung Bae Huh, Incheon (KR); Jeong Ho Lim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 15/796,346

(22) Filed: Oct. 27, 2017

(65) Prior Publication Data

US 2018/0356016 A1 Dec. 13, 2018

(30) Foreign Application Priority Data

Jun. 12, 2017 (KR) .................. 10-2017-0073029

(51) Int. Cl.
| | |
|---|---|
| *F16L 37/098* | (2006.01) |
| *F16L 19/02* | (2006.01) |
| *F16L 37/133* | (2006.01) |
| *F16L 37/138* | (2006.01) |
| *F16L 37/14* | (2006.01) |
| *F16L 37/092* | (2006.01) |

(52) U.S. Cl.
CPC ......... *F16L 19/0218* (2013.01); *F16L 37/092* (2013.01); *F16L 37/133* (2013.01); *F16L 37/138* (2013.01); *F16L 37/14* (2013.01)

(58) Field of Classification Search
CPC ..... F16L 37/04; F16L 37/0847; F16L 37/088; F16L 37/098; F16L 37/12; F16L 37/133; F16L 37/138
USPC .......................... 285/305, 319, 351
See application file for complete search history.

(56) References Cited

U.S. PATENT DOCUMENTS

| | | | | |
|---|---|---|---|---|
| 2,441,344 | A * | 5/1948 | Bosworth | F16L 19/028 285/321 |
| 3,245,703 | A * | 4/1966 | Manly | F16L 37/0847 285/319 |
| 3,997,196 | A * | 12/1976 | Karcher | F16L 37/133 285/86 |
| 4,036,515 | A * | 7/1977 | Karcher | F16L 37/133 285/315 |
| 4,828,297 | A * | 5/1989 | Tarum | F16L 37/008 285/305 |

(Continued)

FOREIGN PATENT DOCUMENTS

| | | |
|---|---|---|
| EP | 0995938 A2 | 4/2000 |
| KR | 10-1092708 B1 | 12/2011 |

*Primary Examiner* — Aaron M Dunwoody
(74) *Attorney, Agent, or Firm* — Morgan, Lewis & Bockius LLP

(57) ABSTRACT

A hydraulic tube connector for a vehicle includes: a connector body including a first through-hole, into which a tube having a tube protrusion extending outward from the tube is inserted, and a sealing O-ring hole at one side of the first through-hole; a sealing O-ring coupled to the sealing O-ring hole and into which the tube is inserted; and a stopper coupled to the connector body to prevent the sealing O-ring from being separated from the sealing O-ring hole and including a stopper groove having one side opened to allow the tube to be fitted through the stopper groove.

13 Claims, 8 Drawing Sheets

(56) References Cited

U.S. PATENT DOCUMENTS

| | | | | |
|---|---|---|---|---|
| 5,078,434 | A * | 1/1992 | Coya | F16L 37/0982 285/315 |
| 5,429,395 | A * | 7/1995 | Ketcham | F16L 37/0847 285/319 |
| 5,634,673 | A * | 6/1997 | Miyazaki | F16L 37/0847 285/148.5 |
| 5,725,257 | A * | 3/1998 | Sakane | F16L 37/088 285/81 |
| 6,267,416 | B1 * | 7/2001 | Ferreira | F16L 37/008 285/319 |
| 6,447,024 | B1 * | 9/2002 | Olson | F16L 37/098 285/319 |
| 6,543,814 | B2 * | 4/2003 | Bartholomew | F16L 37/0987 285/319 |
| 8,042,839 | B2 * | 10/2011 | Rammhofer | F16L 23/0283 285/215 |
| 2005/0029810 | A1 * | 2/2005 | Dong | F16L 37/098 285/308 |
| 2007/0228731 | A1 * | 10/2007 | Elflein | F16L 37/088 285/347 |
| 2008/0048447 | A1 * | 2/2008 | Yoshino | F16L 37/098 285/376 |
| 2008/0157525 | A1 * | 7/2008 | Yoshino | F16L 37/0841 285/376 |
| 2008/0252071 | A1 * | 10/2008 | Lechner | F02M 37/0017 285/319 |
| 2010/0225104 | A1 * | 9/2010 | Ully | F02M 55/002 285/81 |
| 2011/0291404 | A1 * | 12/2011 | Pernikl | F16L 37/098 285/81 |
| 2012/0153612 | A1 * | 6/2012 | Thomson | F16L 37/098 285/81 |
| 2013/0154258 | A1 * | 6/2013 | Schroter | F16L 37/12 285/305 |
| 2015/0345684 | A1 * | 12/2015 | Kujawski, Jr. | F02M 35/10091 285/86 |
| 2015/0354741 | A1 * | 12/2015 | Montag | F16L 37/088 285/317 |
| 2016/0018035 | A1 * | 1/2016 | Seong | F02M 59/44 285/34 |
| 2016/0245441 | A1 * | 8/2016 | Klein | F16L 33/00 |
| 2018/0180206 | A1 * | 6/2018 | Kim | F16L 37/02 |

* cited by examiner

HYDRAULIC TUBE CONNECTOR FOR VEHICLE

CROSS-REFERENCE(S) TO RELATED APPLICATIONS

The present application claims the benefit of priority to Korean Patent Application No. 10-2017-0073029, filed on Jun. 12, 2017, in the Korean Intellectual Property Office, the disclosure of which is incorporated herein by reference.

TECHNICAL FIELD

The present disclosure relates to a hydraulic tube connector for a vehicle, and more particularly, to a hydraulic tube connector for a vehicle having improved assemblability.

BACKGROUND

Generally, a vehicle includes a clutch that is installed between a flywheel and a transmission to engage and disengage power transmitted from an engine. The clutch disengages the connection with the engine when the engine is started or when gears are shifted, and functions to engage the power from the engine when the vehicle starts and runs.

Generally, in a clutch system using hydraulic pressure, a hydraulic tube that transfers hydraulic pressure from a clutch master cylinder to a release cylinder may be used.

A connector may be disposed to connect the hydraulic tube to the clutch master cylinder. The connector connects the hydraulic tube to the clutch master cylinder while preventing oil leakage.

Connectors are made of steel which increases the manufacturing cost and weight thereof. In addition, the connectors made of steel are required to be precisely machined, which in turn decreases productivity.

Connectors made of a plastic material include a plurality of slots. The slots move away from each other outwardly, to be forcibly inserted around the hydraulic tube. However, in such interference fitting process the connector may be permanently deformed, generating a gap between the hydraulic tube and the connector, which may cause oil leakage.

In addition, when the hydraulic tube is subjected to plating and coating, the plating and coating may peel off due to the interference fitting which may increase the possibility of corrosion.

SUMMARY

An aspect of the present disclosure provides a hydraulic tube connector for a vehicle having improved assemblability.

Another aspect of the present disclosure provides a hydraulic tube connector for a vehicle in which corrosion resistance is improved since the coating of the hydraulic tube is not peeled off when the connector and the hydraulic tube are assembled.

Another aspect of the present disclosure provides a hydraulic tube connector for a vehicle having improved performance for preventing oil leakage.

Another aspect of the present disclosure provides a hydraulic tube connector for a vehicle in which a mold for manufacturing the connector is simplified and costs for the mold are reduced.

Another aspect of the present disclosure provides a hydraulic tube connector for a vehicle in which the structure of the connector is simple and the production cost is reduced.

Another aspect of the present disclosure provides a hydraulic tube connector for a vehicle having an improved coupling force with a hydraulic tube.

Additional aspects of the invention will be set forth in part in the description which follows and, in part, will be obvious from the description, or may be learned by practice of the invention.

In accordance with an aspect of the present disclosure, a hydraulic tube connector for a vehicle includes: a connector body including a first through-hole, into which a tube having a tube protrusion extending outward from the tube is configured to be inserted, and a sealing O-ring hole at one side of the first through-hole; a sealing O-ring coupled to the sealing O-ring hole and into which the tube is inserted; and a stopper coupled to the connector body to prevent the sealing O-ring from being separated from the sealing O-ring hole and including a stopper groove having one side opened to allow the tube to be fitted through the stopper groove.

The stopper may further include a push portion configured to press the tube protrusion such that the tube protrusion is in contact with the sealing O-ring and a tube coupling portion extending from the push portion to surround the tube.

The stopper may further include a flange portion extending from the tube coupling portion and configured to contact a rear surface of the connector body, and a second through-hole into which the tube is inserted.

The stopper may further include a plurality of coupling protrusions protruding outward from the tube coupling portion such that the stopper is coupled to the connector body.

The connector body may further include a plurality of coupling grooves spaced apart from each other in a circumferential direction of the connector body and coupled with the plurality of coupling protrusions.

The plurality of coupling protrusions may include a main coupling protrusion disposed to face the stopper groove and an auxiliary coupling protrusion having a height protruding from the tube coupling portion which is lower than a height of the main coupling protrusion.

The tube coupling portion may include a slit portion configured to separate the main coupling protrusion from the push portion such that the main coupling protrusion has an elastic force.

The number of the plurality of coupling grooves may be greater than the number of the plurality of coupling protrusions such that the stopper groove corresponds to one of the plurality of coupling grooves.

The stopper may further include a rib disposed between the plurality of coupling protrusions and protruding outward from the tube coupling portion.

The connector body may further include a guide groove coupled with the rib such that the plurality of coupling protrusions are guided to the plurality of coupling grooves.

The connector body and the stopper may be made of a plastic material.

The stopper may have a C-shape with one side opened.

The stopper may be configured to be coupled with the connector body in a one-touch fitting manner.

The connector body may further include an O-ring groove along an outer circumferential surface of the connector body and configured to receive an O-ring.

The connector body may further include a stopper hole into which the stopper is inserted, and the first through-hole, the sealing O-ring hole, and the stopper hole may be arranged such that the centers thereof coincide with each other.

A diameter of the first through-hole may be smaller than an external diameter of the tube protrusion and a diameter of the stopper hole may be larger than the external diameter of the tube protrusion.

In accordance with another aspect of the present disclosure, a hydraulic tube connector for a vehicle includes a sealing O-ring into which a tube having a tube protrusion extending outward from the tube is inserted, a connector body including a sealing O-ring hole into which the tube protrusion and the sealing O-ring are inserted, and a stopper having a coupling protrusion configured to couple with the connector body. The stopper may include a tube coupling portion configured to surround the tube, a push portion extending from an end of the tube coupling portion to press the tube protrusion, and a stopper groove opened at one side of the tube coupling portion and the push portion.

The sealing O-ring may be in close contact with one side of the tube protrusion, and another side of the tube protrusion may be in close contact with the push portion.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
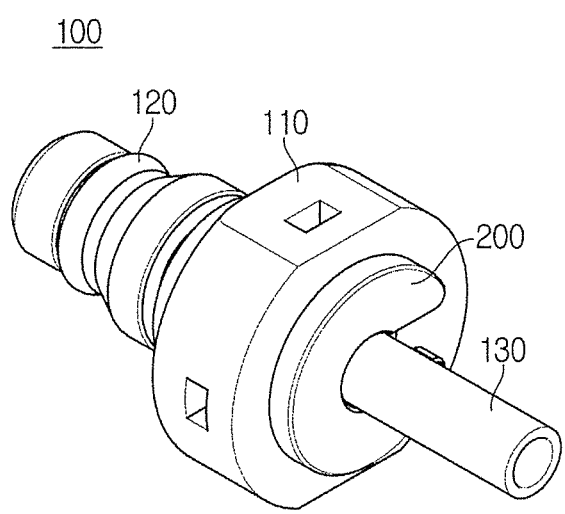
FIG. 1 is a view illustrating a state in which a hydraulic tube connector for a vehicle according to an exemplary embodiment of the present disclosure is coupled with a tube.

Configurations illustrated in the embodiments and the drawings described in the present specification are only the preferred embodiments of the present disclosure, and thus, it is to be understood that various modified examples, which may replace the embodiments and the drawings described in the present specification, are possible when filing the present application.

Like reference numerals or symbols denoted in the drawings of the present specification indicate elements or components that perform substantially the same functions. The terms used in the present specification are for describing embodiments and not for limiting or restricting the present disclosure.

It is to be understood that the singular forms "a," "an," and "the" include plural referents unless the context clearly dictates otherwise. It will be understood that when the terms "includes," "comprises," "including," and/or "comprising" when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another.

For example, a first component could be termed a second component, and, similarly, a second component could be termed a first component, without departing from the scope of the present disclosure. As used herein, the term "and/or" includes any and all combinations of one or more associated listed items.

In the following description, the terms "front direction," "rear direction," "upper portion," "lower portion," etc. are defined based on the drawings, and do not intend to limit the shapes and locations of individual components.

In the following description, a vehicle includes various kinds of machines that transport humans, goods, or animals from a departure point to a destination. For example, the vehicle may be an automobile to travel on roads or rails, a ship to travel by the sea or river, or a plane to fly in the sky using the action of air.

A vehicle traveling on roads or rails may move in a predetermined direction by the rotation of at least one rotating wheel. The vehicle may include a three- or four-wheeled vehicle, construction machinery, a two-wheeled vehicle, a prime mover, a bicycle, and a train travelling along rails.

Hereinafter, exemplary embodiments according to the present disclosure will be described in detail with reference to the accompanying drawings.

A vehicle may include various vehicle pedals such as an accelerator pedal for accelerating the vehicle, a brake pedal for stopping, and a clutch pedal for transmission.

A hydraulic tube connector according to the present disclosure may be combined with various parts in a hydraulic system. For example, the connector may be coupled to one end of a tube that transfers hydraulic pressure from a clutch pedal to a transmission so that the connector is combined with a clutch master cylinder (CMC). In addition, the connector may be combined with a concentric slave cylinder (CSC), a clutch release cylinder (CRC) or the like.

Figure 2:
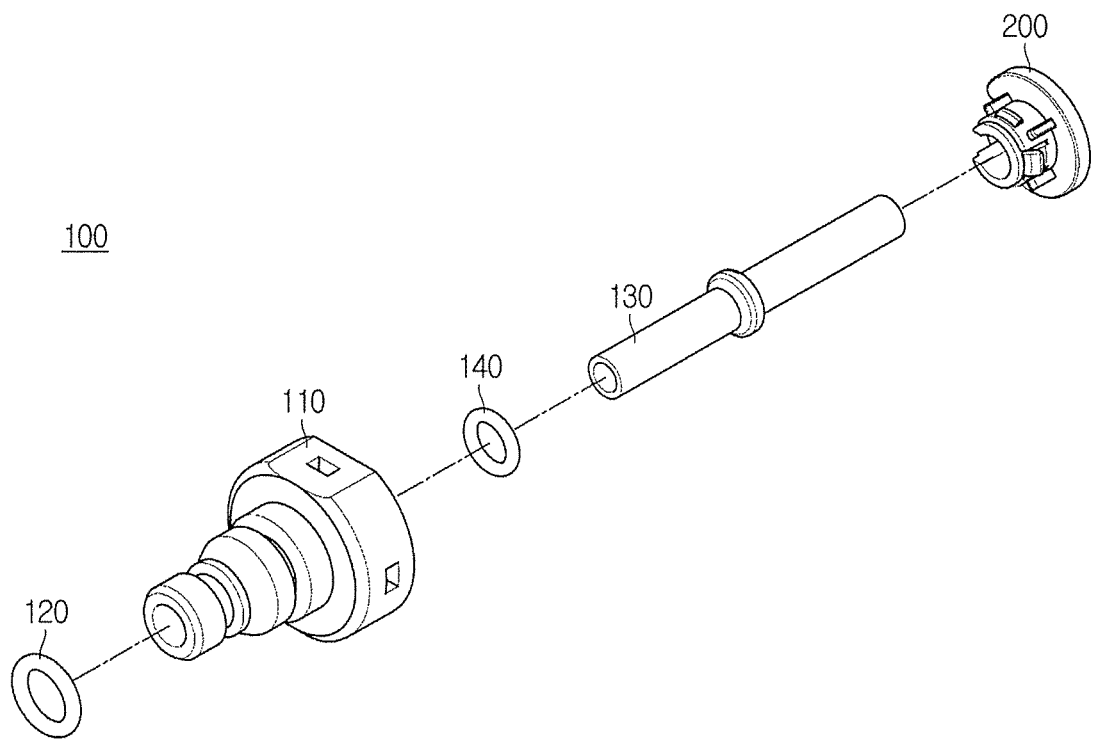
FIG. 2 is an exploded view illustrating the hydraulic tube connector according to the exemplary embodiment of the present disclosure and the tube.

FIG. 1 is a view illustrating a state in which a hydraulic tube connector for a vehicle according to an exemplary embodiment of the present disclosure is coupled with a tube, and FIG. 2 is an exploded view illustrating the hydraulic tube connector according to the exemplary embodiment of the present disclosure and the tube.

As illustrated in FIGS. 1 and 2, a hydraulic tube connector 100 for a vehicle according to an exemplary embodiment of the present disclosure may include a connector body 110, an O-ring 120, a sealing O-ring 140, and a stopper 200. The hydraulic tube connector 100 may be coupled with a tube 130.

The sealing O-ring 140 and the stopper 200 may be coupled to the connector body 110. The tube 130 including a tube protrusion 131 may be coupled to the connector body 110.

The tube protrusion 131 may protrude toward the outside of the tube 130. The tube protrusion 131 may be integrally formed with the tube 130 along a circumferential direction of the tube 130. Since the tube protrusion 131 protrudes toward the outside of the tube 130, an external diameter of the tube protrusion 131 may be larger than an external diameter of the other part of the tube 130.

The tube protrusion 131 may be adjacent to one end of the tube 130 coupled to the connector body 110.

The sealing O-ring 140 may be configured such that the tube 130 including the tube protrusion 131 protruding outward is inserted into the sealing O-ring 140. The sealing O-ring 140 may be inserted into a sealing O-ring hole 113. The sealing O-ring 140 may prevent oil from leaking out of the connector body 110.

The connector body 110 and the stopper 200 of the hydraulic tube connector 100 may be made of a plastic material. The connector body 110 and the stopper 200 may be formed by injection molding.

The connector body 110 and the stopper 200 are formed by injection molding using a plastic material so that molds for manufacturing the connector body 110 and the stopper 200 are simplified and productivity is improved. Therefore, it is advantageous in terms of cost and weight. Injection molding may be cost-effective in manufacturing because of its simple process.

The hydraulic tube connector 100 may include the O-ring 120 to prevent oil leakage during engagement with a clutch master cylinder.

The connector body 110 may include an O-ring groove 111 formed along an outer circumferential surface of the connector body 110 and configured to be coupled with the O-ring 120. The O-ring groove 111 may be recessed inward along the outer circumferential surface of the connector body 110. The O-ring 120 may be fitted to the O-ring groove 111.

Figure 3:
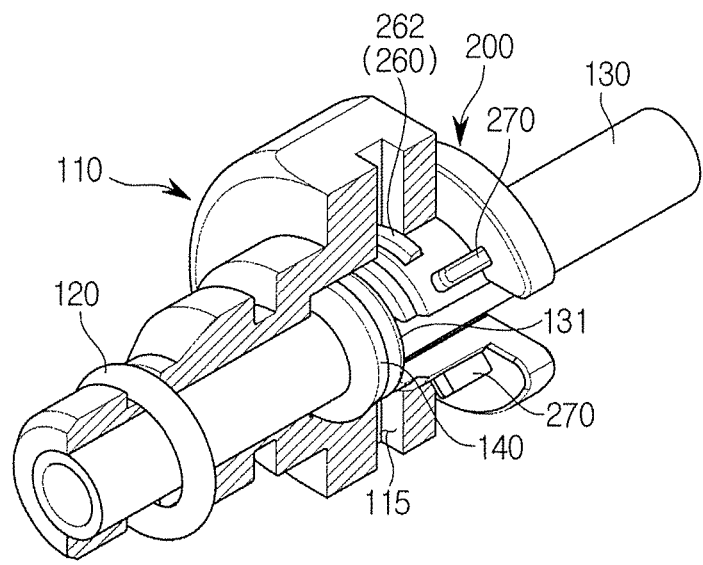
FIG. 3 is a cross-sectional perspective view of the hydraulic tube connector according to the exemplary embodiment of the present disclosure and the tube.
Figure 4:
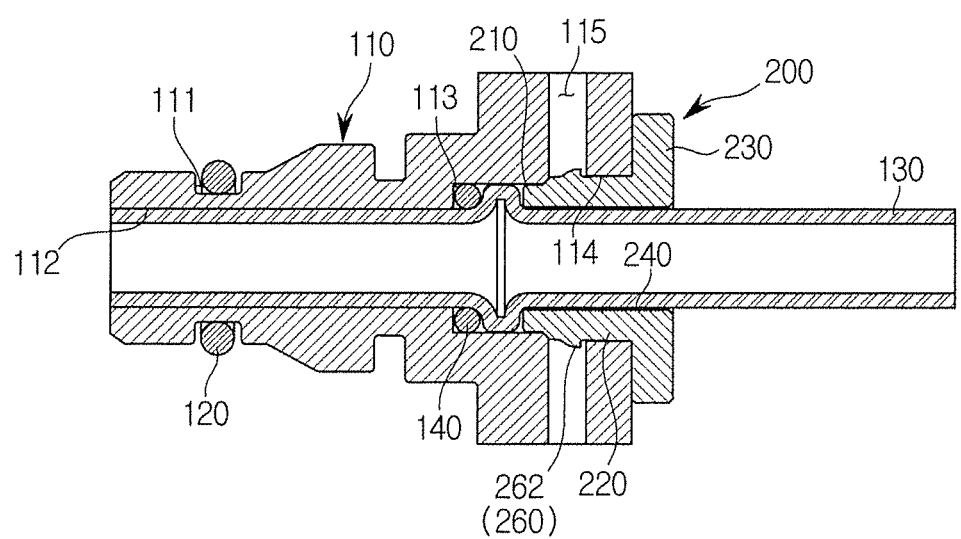
FIG. 4 is a cross-sectional view of the hydraulic tube connector according to the exemplary embodiment of the present disclosure and the tube.

FIG. 3 is a cross-sectional perspective view of the hydraulic tube connector according to the exemplary embodiment of the present disclosure and the tube, and FIG. 4 is a cross-sectional view of the hydraulic tube connector according to the exemplary embodiment of the present disclosure and the tube.

As illustrated in FIGS. 3 and 4, the connector body 110 of the hydraulic tube connector 100 may include a first through-hole 112. The first through-hole 112 may be formed such that the tube 130 is inserted into the first through-hole 112.

The first through-hole 112 may be formed such that the tube protrusion 131 is not inserted thereinto. The internal diameter of the first through-hole 112 may be larger than the external diameter of the tube 130 and may be smaller than the external diameter of the tube protrusion 131.

The connector body 110 may include the sealing O-ring hole 113 provided at one end of the first through-hole 112. The sealing O-ring hole 113 may be connected to the first through-hole 112. The internal diameter of the sealing O-ring hole 113 may be larger than the internal diameter of the first through-hole 112. The sealing O-ring 140 may be inserted and coupled to the sealing O-ring hole 113.

The connector body 110 may include coupling grooves 115 spaced apart from each other along the outer circumferential surface of the connector body 110 and coupled with coupling protrusions 260. A detailed description thereof will be described later.

The connector body 110 may include a stopper hole 114 into which the stopper 200 is inserted. The first through-hole 112, the sealing O-ring hole 113, and the stopper hole 114 may be arranged such that the centers thereof coincide with each other.

The diameter of the first through-hole 112 may be smaller than the diameter of the tube protrusion 131 and the diameters of the sealing O-ring hole 113 and the stopper hole 114 may be larger than the external diameter of the tube protrusion 131.

The stopper 200 inserted into the stopper hole 114 may include a push portion 210 for pressing the tube protrusion 131, a tube coupling portion 220 extending from the push portion 210, and a flange portion 230 extending from the tube coupling portion 220.

The stopper 200 may include a second through-hole 240 through which the tube 130 is inserted and a stopper groove 250 having one side opened.

The detailed structure of the stopper 200 will be described later.

The sealing O-ring 140 may be disposed to be in close contact with the sealing O-ring hole 113. The sealing O-ring 140 may be in close contact with one side of the tube protrusion 131 and the other side of the tube protrusion 131 may be in close contact with the push portion 210.

Since the stopper 200 includes the stopper groove 250 with one side opened, if the sealing O-ring 140 is directly pressed, the leakage preventing function of the sealing O-ring 140 may be deteriorated.

The hydraulic tube connector 100 may be configured such that the push portion 210 does not directly press the sealing O-ring 140, but instead the push portion 210 presses the tube protrusion 131, and the tube protrusion 131, which is not opened but has a circular shape, presses the sealing O-ring 140.

Therefore, even if the stopper groove 250 is provided, it is possible to prevent deterioration of performance in preventing oil leakage since the push portion 210 is capable of indirectly pressing the sealing O-ring 140 by means of the tube protrusion 131.

Figure 5:
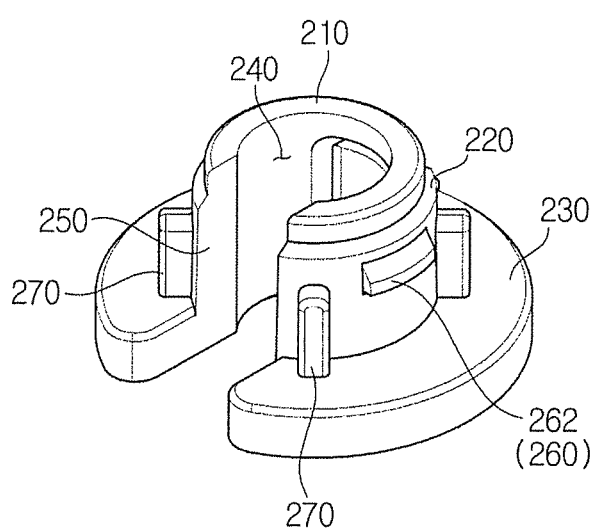
FIG. 5 is a perspective view illustrating a stopper in the hydraulic tube connector according to the exemplary embodiment of the present disclosure.
Figure 6:
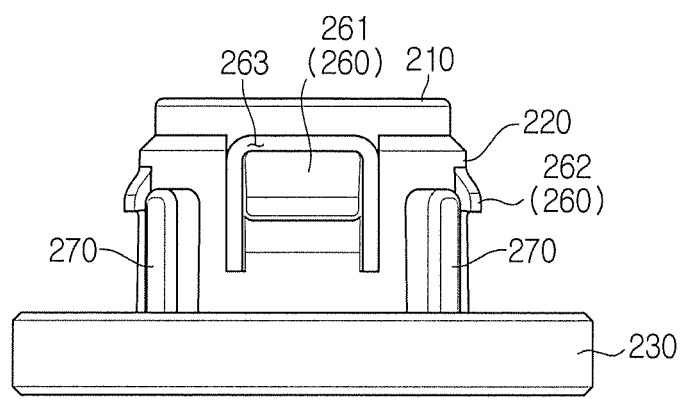
FIG. 6 is a side view illustrating the stopper in the hydraulic tube connector according to the exemplary embodiment of the present disclosure.

FIG. 5 is a perspective view illustrating a stopper in the hydraulic tube connector according to the exemplary embodiment of the present disclosure, and FIG. 6 is a side view illustrating the stopper in the hydraulic tube connector according to the exemplary embodiment of the present disclosure.

As illustrated in FIGS. 5 and 6, the hydraulic tube connector 100 includes the stopper 200 having the stopper groove 250. The stopper 200 may have a C-shape with one side opened.

The stopper 200 includes the push portion 210 configured to press the tube protrusion 131 such that the tube protrusion 131 comes in close contact with the sealing O-ring 140 and the tube coupling portion 220 extending from the push portion 210 to surround the tube 130.

The push portion 210 may press the tube protrusion 131 such that the sealing O-ring 140 comes in close contact with the sealing O-ring hole 113. Thus, the sealing O-ring 140 may not separate from the sealing O-ring hole 113, and may be closely contacted with the sealing O-ring hole 113 without a gap therebetween.

The stopper 200 includes the flange portion 230 extending from the tube coupling portion 220 and configured to contact a rear surface of the connector body 110, and the second through-hole 240 through which the tube 130 is inserted.

The flange portion 230 may have a flat ring shape. The second through-hole 240 may be formed at the center of the flange portion 230 to allow the tube protrusion 131 to pass through the second through-hole 240.

The center of the second through-hole 240 may be aligned with the center of the first through-hole 112. The flange portion 230 may contact the connector body 110 to restrict movement of the stopper 200 in a direction in which the stopper 200 is coupled to the connector body 110.

The stopper groove 250 may be opened at one side of the stopper 200 such that the stopper groove 250 is coupled with the connector body 110 to prevent the sealing O-ring 140 from being separated from the sealing O-ring hole 113 and the tube is forcibly fitted through the stopper groove 250.

If the stopper groove 250 in which the one side of the stopper 200 is opened is not provided, when the long tube 130 is to be coupled to the hydraulic tube connector 100, the stopper 200 may be inserted from the other side opposite to one side of the tube 130 in which the tube is coupled to the hydraulic tube connector 100. Therefore, the assemblability of the connector body 110 and the stopper 200 may be remarkably deteriorated.

However, since the hydraulic tube connector 100 according to the present disclosure includes the stopper groove 250, the stopper 200 may be freely coupled to the tube 130 at any position of the tube 130.

Therefore, the assemblability of the connector body 110 and the stopper 200 may be greatly improved.

The stopper 200 may include the coupling protrusion 260 protruding outward from the tube coupling portion 220 so that the stopper 200 is coupled to the connector body 110.

The coupling protrusion 260 may be engaged with the coupling groove 115. When the coupling protrusion 260 is coupled with the coupling groove 115, the stopper 200 may couple with the connector body 110.

The coupling protrusion 260 may include a main coupling protrusion 261 disposed to face the stopper groove 250 and an auxiliary coupling protrusion 262 having a height protruding from the tube coupling portion 220 which is lower than a height of the main coupling protrusion 261.

The auxiliary coupling protrusion 262 may be relatively easily coupled to the coupling groove 115 of the connector body 110 because the height of the auxiliary coupling protrusion 262 protruding from the tube coupling portion 220 is relatively low. Therefore, the assemblability of the auxiliary coupling protrusion 262 and the coupling groove 115 is improved.

However, the height of the main coupling protrusion 261 protruding from the tube coupling portion 220 may be relatively high to compensate for the low height of the auxiliary coupling protrusion 262.

By increasing the height of the main coupling protrusion 261 protruding from the tube coupling portion 220 in order to increase the coupling force between the connector body 110 and the stopper 200, the assemblability of the coupling groove 115 and the main coupling protrusion 261 may be deteriorated The tube coupling portion 220 of the hydraulic tube connector 100 may include a slit portion 263 configured to separate the main coupling protrusion 261 and the push portion 210 such that the main coupling protrusion 261 has an elastic force.

Since the elastic force of the main coupling protrusion 261 is increased by the slit portion 263, even though the height of the main coupling protrusion 261 protruding from the tube coupling portion 220 is relatively high, the assemblability of the coupling groove 115 and the main coupling protrusion 261 may be ensured.

The coupling protrusion 260 may be disposed in a plurality thereof. The plurality of coupling protrusions 260 may include three coupling protrusions 260. However, the present disclosure is not limited thereto, and three or more coupling protrusions 260 may be provided.

Two auxiliary coupling protrusions 262 may be arranged to face each other. However, the present disclosure is not limited thereto, and the auxiliary coupling protrusions 262 may be arranged so as not to face each other. The auxiliary coupling protrusions 262 may be spaced apart from each other along a circumferential direction of the tube coupling portion 220.

The stopper 200 may include a rib 270 disposed between the plurality of coupling protrusions 260 and protruding outward from the tube coupling portion 220. The rib 270 may reinforce the strength of the stopper 200.

The rib 270 may protrude axially from the flange portion 230. The rib 270 may be disposed in a plurality thereof. The ribs 270 may be provided as four ribs 270, and the four ribs 270 may be arranged to face each other.

However, the present disclosure is not limited thereto and the number of the ribs 270 may be various, and the plurality of ribs 270 may be arranged not to face each other. The ribs 270 may be disposed apart from each other in a circumferential direction of the flange portion 230.

Figure 7:
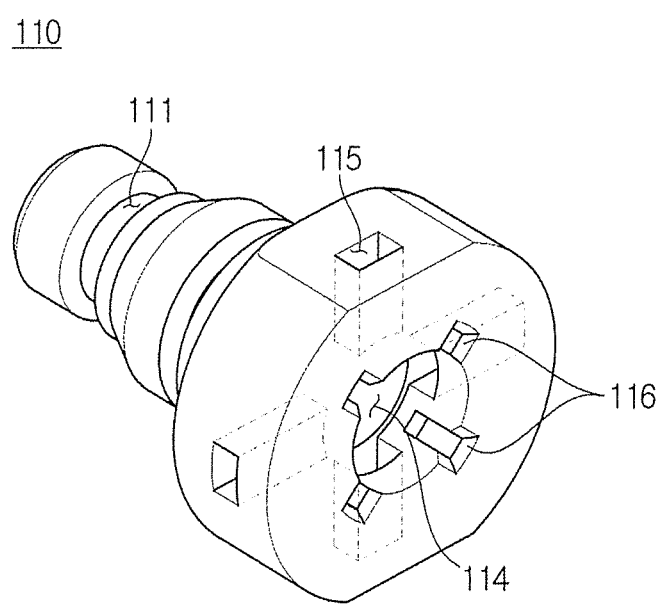
FIG. 7 is a view illustrating a coupling groove and a guide groove of a connector body in the hydraulic tube connector according to the exemplary embodiment of the present disclosure.

FIG. 7 is a view illustrating a coupling groove and a guide groove of a connector body in the hydraulic tube connector according to the exemplary embodiment of the present disclosure. As illustrated in FIG. 7, the number of the plurality of coupling grooves 115 may be greater than the number of the coupling protrusions 260 so that the stopper groove 250 corresponds to one of the plurality of coupling grooves 115.

The connector body 110 may include a guide groove 116 configured to couple with the rib 270 such that the plurality of coupling protrusions 260 are guided to the plurality of coupling grooves 115.

The connector body 110 includes the plurality of coupling grooves 115 spaced apart from each other in the circumferential direction of the connector body 110. The coupling grooves 115 may be provided as four coupling grooves 115. However, this is only an example, and the number of the coupling grooves 115 may be changed.

Figure 8:
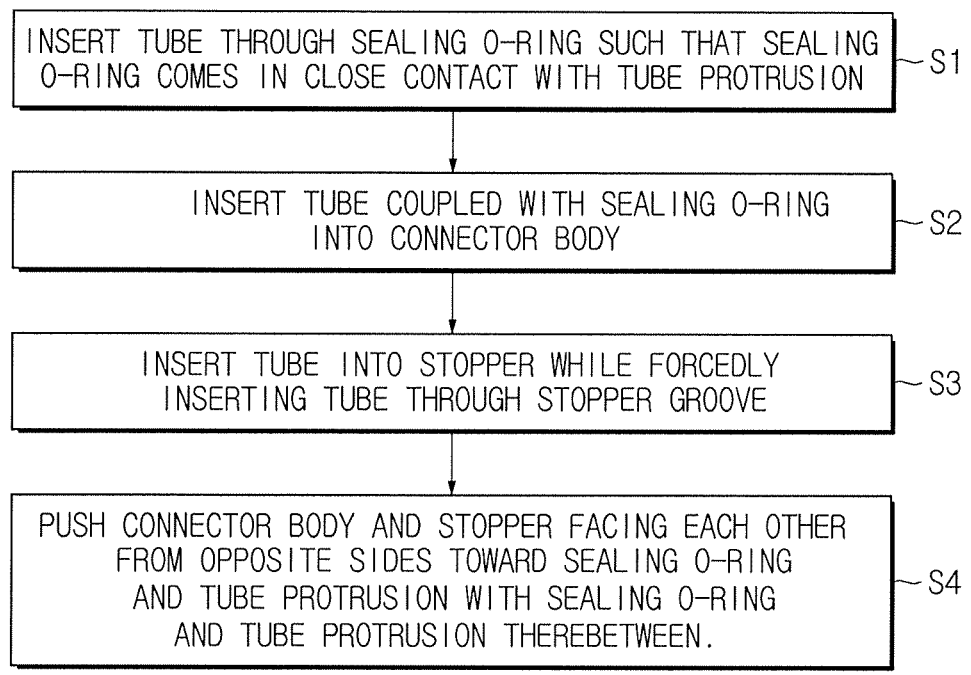
FIG. 8 is a block diagram showing a method of assembling a hydraulic tube connector for a vehicle according to an exemplary embodiment of the present disclosure and a tube.

FIG. 8 is a block diagram showing a method of assembling a hydraulic tube connector for a vehicle according to an exemplary embodiment of the present disclosure and a tube. As shown in FIG. 8, the stopper 200 may be configured to be coupled with the connector body 110 in a one-touch fitting manner.

Hereinafter, a method of coupling the hydraulic tube connector 100 for a vehicle according to the present disclosure with the tube 130 will be described in detail.

When the tube 130 coupled with the sealing O-ring 140 is inserted into the sealing O-ring hole 113, the sealing O-ring 140 is inserted into the sealing O-ring hole 113 until the sealing O-ring 140 is caught in the sealing O-ring hole 113. When the sealing O-ring 140 is in contact with the sealing O-ring hole 113, the tube 130 may no longer be inserted even if a force is applied in a direction of inserting the tube 130 into the sealing O-ring hole 113.

Since the tube 130 is not fixed, the tube 130 may be pulled out from the sealing O-ring hole 113 in the opposite direction. Therefore, the stopper 200 may be provided as a structure for coupling the tube 130 to the connector body 110.

The stopper 200 is capable of restricting the movement of the tube 130 in a longitudinal direction. The push portion 210 of the stopper 200 contacts the tube protrusion 131 and presses the tube protrusion 131. As a result, the movement of the tube 130 is restricted in the longitudinal direction. Since the tube 130 is inserted into the first through-hole 112 and the tube coupling portion 220 is coupled with the tube 130, the movement of the tube 130 may be restricted in a radial direction.

The method of coupling the hydraulic tube connector 100 with the tube 130 may include inserting the tube 130 through the sealing O-ring 140 such that the sealing O-ring 140 comes in close contact with the tube protrusion 131, inserting the tube 130 coupled with the sealing O-ring 140 into the connector body 110, inserting the tube 130 into the stopper 200 while forcedly inserting the tube 130 through the stopper groove 250 having one side opened, and pushing and coupling the connector body 110 and the stopper 200 to each other with the sealing O-ring 140 and the tube protrusion 131 interposed therebetween.

The stopper 200 includes the coupling protrusion 260 and the connector body 110 includes the coupling groove 115 engaging with the coupling protrusion 260 so that the stopper 200 is coupled to the connector body 110 by one-touch fitting.

The O-ring 120 may be fitted to the connector body 110 after the tube 130 is coupled to the connector body 110. The sealing O-ring hole 113 is disposed to correspond to the sealing O-ring 140. The sealing O-ring 140 is inserted into the sealing O-ring hole 113.

When the stopper 200 is coupled to the connector body 110, an external force may be required. The stopper hole 114 is formed on one side of the connector body 110 to allow the stopper 200 to be inserted.

In order for the coupling protrusion 260 to pass through the coupling groove 115, the coupling protrusion 260 may be elastically deformed. Therefore, when the stopper 200 is coupled to the connector body 110, a user can apply an external force to the stopper 200 to elastically deform the coupling protrusion 260.

Since the coupling protrusion 260 includes an inclined surface for allowing the coupling protrusion 260 to engage with the coupling groove 115, the user can apply a predetermined force to engage the stopper 200 with the connector body 110.

The tube coupling portion 220 surrounds the tube 130. The tube coupling portion 220 includes the stopper groove 250 formed to be opened at one side thereof. The tube 130 may be coupled with the tube coupling portion 220 through the stopper groove 250.

The stopper groove 250 may be smaller than the diameter of the tube 130. When the tube 130 passes through the stopper groove 250, the tube coupling portion 220 is elastically deformed.

The tube 130 is coupled to the tube coupling portion 220 through the stopper groove 250 when the stopper groove 250 is extended by the elastic deformation of the tube coupling portion 220.

The tube 130 is inserted into the second through-hole 240 which is an inner space of the tube coupling portion 220 and the tube coupling portion 220 surrounds the tube 130 when the tube 130 is coupled with the tube coupling portion 220. Through the above process, the stopper 200 is coupled with the tube 130 and the connector body 110.

According to the present disclosure, since the stopper 200 is coupled with the tube 130 and the connector body 110 by means of a one-touch operation, there is an advantage in that the stopper 200 can be easily coupled to the tube 130 and the connector body 110.

According to the present disclosure, a user may easily assemble the hydraulic tube connector 100 with the tube 130 without a separate fastening device. Therefore, the hydraulic tube connector 100 according to the present disclosure can have improved assemblability.

According to the present disclosure, when the hydraulic tube connector 100 and the tube 130 are assembled, the coating of the tube 130 is not peeled off, so that the corrosion resistance can be improved.

According to the present disclosure, the stopper 200 firmly presses the tube 130 and the sealing O-ring 140 inside the connector body 110, thereby improving the performance for preventing oil leakage.

According to the present disclosure, the structures of molds for producing the connector body 110, the sealing O-ring 140, and the stopper 200 that form the hydraulic tube connector 100 are simplified, so that the manufacturing cost of the molds can be reduced.

According to the present disclosure, the structures of the connector body 110, the sealing O-ring 140, and the stopper 200 that form the hydraulic tube connector 100 are simple, so that the manufacturing cost of the hydraulic tube connector 100 can be reduced.

According to the present disclosure, the stopper 200 firmly presses the tube 130 and the sealing O-ring 140 against the inside of the connector body 110, so that the coupling force between the tube 130 and the hydraulic tube connector 100 can be improved.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A hydraulic tube connector for a vehicle, the hydraulic tube connector comprising:
   a connector body including a first through-hole, into which a tube having a tube protrusion extending outward from the tube is inserted, and a sealing O-ring hole at one side of the first through-hole;
   a sealing O-ring, into which the tube is inserted, coupled to the sealing O-ring hole; and
   a stopper coupled to the connector body to prevent the sealing O-ring from being separated from the sealing O-ring hole, the stopper including a stopper groove having one side opened to allow the tube to be fitted through the stopper groove,
   wherein the stopper further includes a plurality of coupling protrusions protruding outward from the tube coupling portion such that the stopper is coupled to the connector body,
   wherein the connector body includes a plurality of coupling grooves spaced apart from each other in a circumferential direction of the connector body and coupled with the plurality of coupling protrusions, and
   wherein one of the plurality of coupling grooves corresponds to the stopper groove and the rest of the plurality of coupling grooves correspond to the plurality of coupling protrusions, respectively.

2. The hydraulic tube connector according to claim 1, wherein the stopper further includes a push portion configured to press the tube protrusion such that the tube protrusion is in contact with the sealing O-ring and a tube coupling portion extending from the push portion to surround the tube.

3. The hydraulic tube connector according to claim 2, wherein the stopper further includes:
a flange portion extending from the tube coupling portion and configured to contact a rear surface of the connector body; and
a second through-hole into which the tube is inserted.

4. The hydraulic tube connector according to claim 1, wherein the plurality of coupling protrusions include a main coupling protrusion disposed to face the stopper groove and an auxiliary coupling protrusion having a height protruding from the tube coupling portion which is lower than a height of the main coupling protrusion.

5. The hydraulic tube connector according to claim 4, wherein the tube coupling portion includes a slit portion configured to separate the main coupling protrusion from the push portion such that the main coupling protrusion has an elastic force.

6. The hydraulic tube connector according to claim 1, wherein the stopper further includes a rib disposed between the plurality of coupling protrusions and protruding outward from the tube coupling portion.

7. The hydraulic tube connector according to claim 6, wherein the connector body further includes a guide groove coupled with the rib such that the plurality of coupling protrusions are guided to the plurality of coupling grooves.

8. The hydraulic tube connector according to claim 1, wherein the connector body and the stopper are made of a plastic material.

9. The hydraulic tube connector according to claim 1, wherein the stopper has a C-shape with one side opened.

10. The hydraulic tube connector according to claim 1, wherein the stopper is configured to be coupled with the connector body in a one-touch fitting manner.

11. The hydraulic tube connector according to claim 1, wherein the connector body further includes an O-ring groove along an outer circumferential surface of the connector body, the O-ring groove receiving an O-ring.

12. The hydraulic tube connector according to claim 1, wherein the connector body further includes a stopper hole into which the stopper is inserted, and the first through-hole, the sealing O-ring hole, and the stopper hole are arranged such that centers thereof coincide with each other.

13. The hydraulic tube connector according to claim 12, wherein a diameter of the first through-hole is smaller than an external diameter of the tube protrusion and a diameter of the stopper hole is larger than the external diameter of the tube protrusion.

* * * * *